United States Patent [19]

Ahlen

[11] 4,301,904
[45] Nov. 24, 1981

[54] MULTIPLE DISC CLUTCH

[75] Inventor: Karl G. Ahlen, Bromma, Sweden

[73] Assignee: S.R.M. Hydromekanik Aktiebolag, Stockholm-Vallingby, Sweden

[21] Appl. No.: 66,538

[22] Filed: Aug. 15, 1979

[30] Foreign Application Priority Data

Nov. 6, 1978 [GB] United Kingdom ............... 43314/78

[51] Int. Cl.³ ...................... F16D 13/52; F16D 13/72; F16D 25/063
[52] U.S. Cl. .............................. 192/70.12; 192/70.2; 192/70.3; 192/85 A; 192/85 CA
[58] Field of Search .................. 192/70.3, 70.2, 70.25, 192/107 M, 70.12, 70.14, 70.29, 111 A, 85 A, 85 CA, 91 A, 99 A, 89 B; 188/71.5

[56] References Cited

U.S. PATENT DOCUMENTS

| 1,351,006 | 8/1920 | Schneider | 188/71.5 |
| 1,617,717 | 2/1927 | Lombard | 192/70.2 X |
| 1,700,493 | 1/1929 | Guay | 192/70.3 X |
| 1,742,804 | 1/1930 | Carhart | 192/70.12 X |
| 2,204,807 | 6/1940 | McCune et al. | 188/71.5 X |
| 2,927,673 | 3/1960 | Sand | 192/70.14 |
| 3,228,501 | 1/1966 | Eason et al. | 192/70.2 |
| 3,613,848 | 10/1971 | Reiff | 192/85 CA X |
| 3,791,499 | 2/1974 | Ryan | 192/89 B X |
| 4,102,446 | 7/1978 | Rist | 192/91 A |

Primary Examiner—Rodney H. Bonck
Attorney, Agent, or Firm—Larson and Taylor

[57] ABSTRACT

This invention relates to a multiple disc clutch which is particularly suitable for use in a drive line between an engine and a synchromesh gear in a vehicular transmission. A multiple disc clutch in accordance with the present invention may be termed a "half-wet" clutch and it possesses advantages including reducing both the drag torque and the quantity of lubricating oil required.

In particular a multiple disc clutch according to the invention includes first and second sets of interleaved and axially moveable clutch discs, restraining means for restraining at least the axial movement of each disc of the first set of discs, the restraining means comprising a number of first and second sets of stop members disposed alternately and at intervals around the outer circumference of the first set of discs, the first stop members serving to limit the axial position of the first set of discs, when in the disengaged position, in one axial direction and the second stop members serving to limit the axial position of the first set of discs, when in the disengaged position, in the opposite axial direction, thereby defining spaces for each second disc between two succeeding first discs, and means for axially displacing the discs of the first set to establish engagement thereof with the second set of discs.

14 Claims, 7 Drawing Figures

MULTIPLE DISC CLUTCH

This invention relates to a multiple disc clutch which is particularly suitable for use in a drive line between an engine and a synchromesh gear in a vehicular transmission. A multiple disc clutch in accordance with the present invention may be termed a "half-wet" clutch and it possesses advantages including reducing both the drag torque and the quantity of lubricating oil required. These and other advantages will become apparent below.

Hitherto, drive lines between an engine and a synchromesh gear in a vehicle transmission have utilised so-called dry clutches. Dry clutches have a relatively large secondary side mass and this is particularly the case where single plate clutches have been used. In order to reduce such a high secondary side mass, two plate clutches have sometimes been used but in this case the drag torque increases. Furthermore, the use of larger engines necessitated by the requirement of larger and longer motor vehicles, introduces a further problem, namely, difficulties associated with synchronising synchromesh clutches and these difficulties are even more pronounced when two plate dry clutches are used.

It is an object of this invention to provide a multiple disc clutch of the so-called half wet type in which the drag torque is reduced to at least that for a dry clutch of the same capacity and at the same time reduce the secondary side mass to a value which is less than that of the same capacity dry clutch.

It is further object to reduce the primary mass of the clutch which for a dry clutch is also relatively large and thus absorbs a considerable amount of energy.

According to the present invention there is provided a multiple disc clutch including first and second sets of interleaved clutch discs, the discs of the second set forming part of a secondary or output side of the clutch with each respective disc thereof mounted for axial movement between two axially movable discs of the first set which forms a part of a primary or input side of the clutch, restraining means for restraining at least the axial movement of each disc of the first set of discs, the restraining means comprising a number of first and second sets of stop members disposed alternately and at intervals around the outer circumference of the first set of discs, the first stop members serving to limit movement of the first set of discs in one axial direction and the second stop members serving to limit axial movement of the first set of discs in the opposite axial direction, thereby defining spaces for each second disc between two succeeding first discs, and means for axially displacing the discs of the first set to establish engagement and disengagement there of with the second set of discs.

A multiple disc clutch according to the invention will now be described by way of example, with reference to the accompanying drawings in which.

Figure 1:
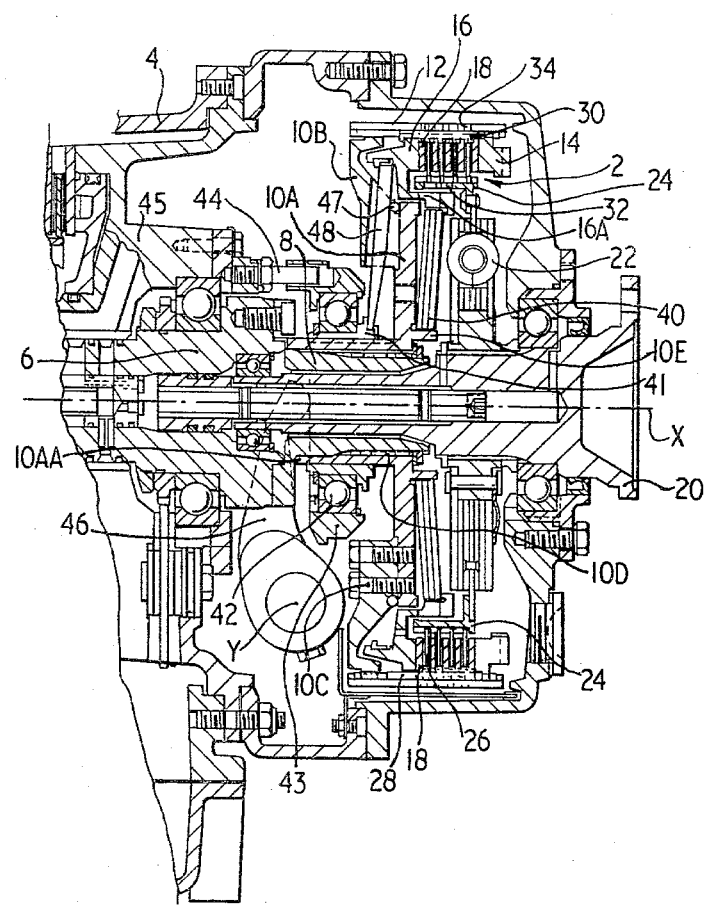
FIG. 1 shows the clutch and its spacing members in section and mounted on a torque coverter casing. The clutch of FIG. 1 is closed by an arrangement of Bellville Springs and opened by a lever arm system operating over a bearing.
Figure 2:
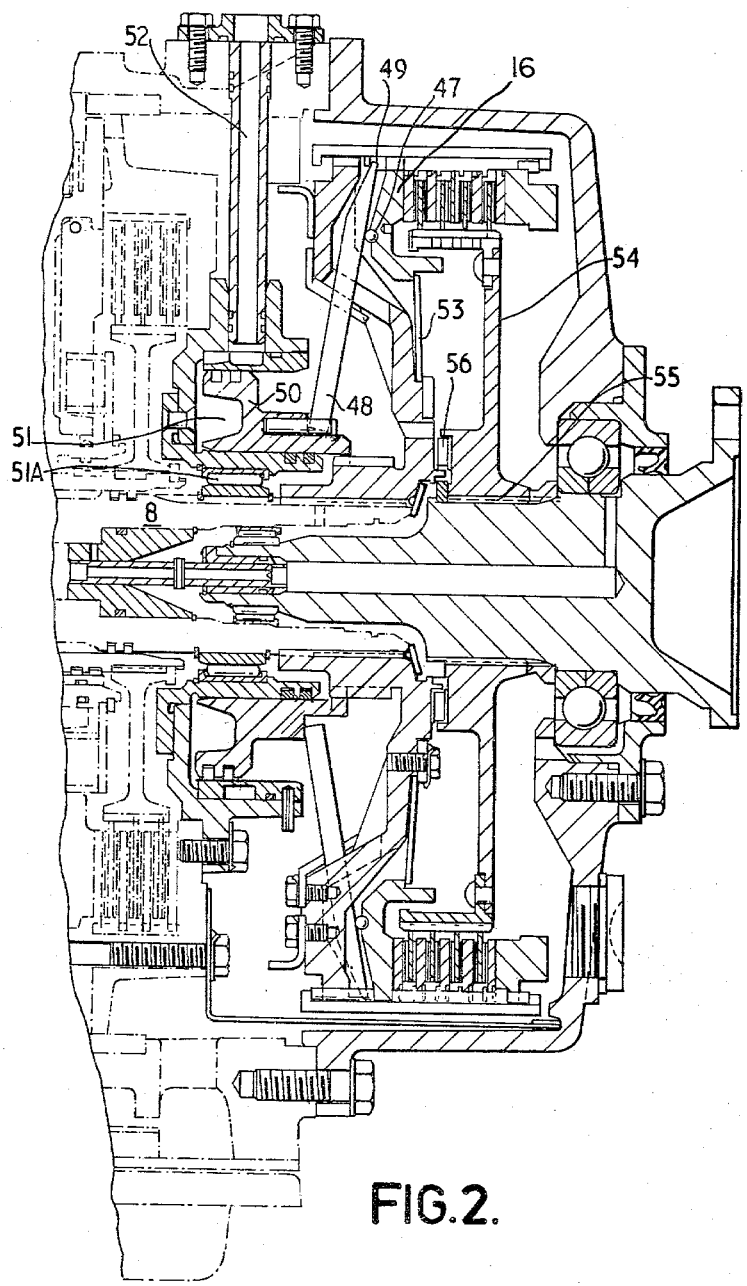
FIG. 2 shows the same clutch as FIG. 1 but in this figure, the clutch is closed by a rotatable servo motor operating over a bearing and a lever arm system and opened by a Bellville Spring.
Figure 3:
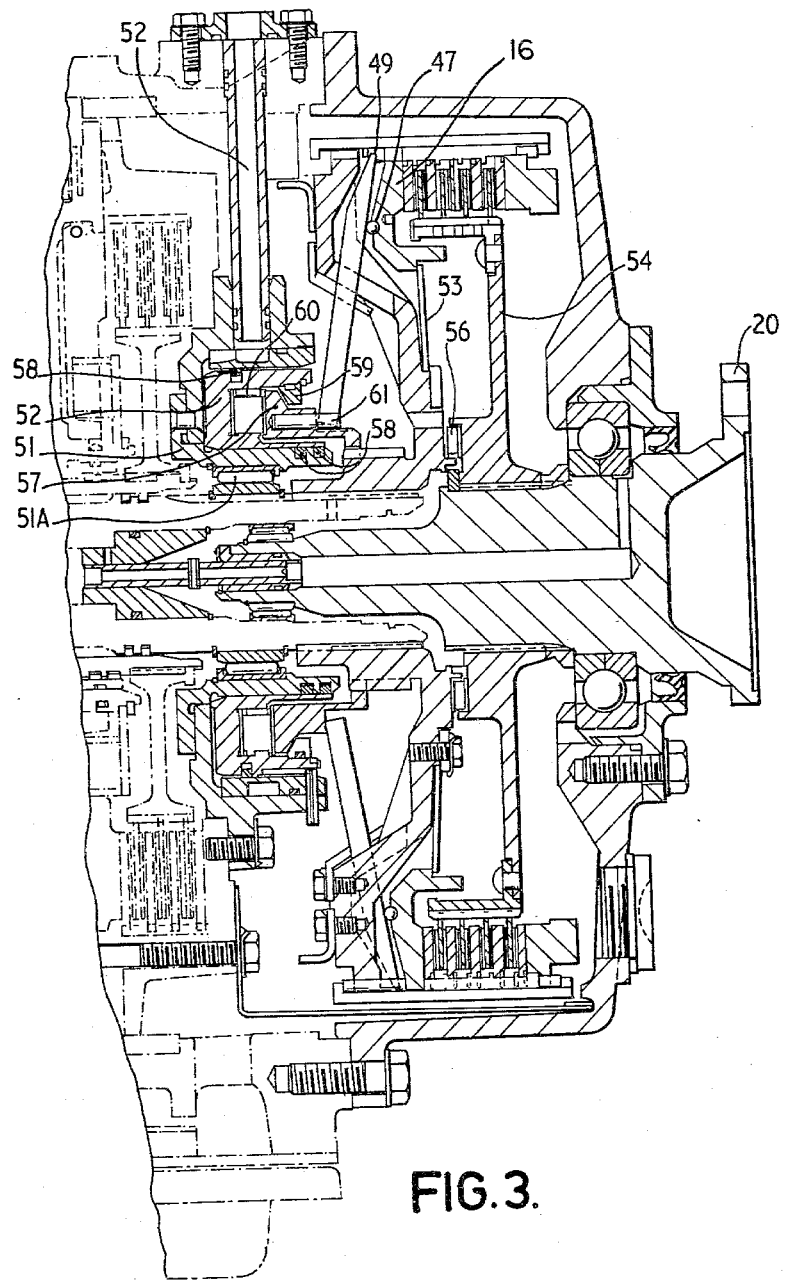
FIG. 3 shows the same clutch as FIG. 2 activated by servo motor arrangement and a spring and modified in that the servo motor arrangement has a non-rotatable part and a rotatable part which operates the clutch over a bearing and a lever arm system.

As indicated above the multiple disc clutches shown in FIGS. 1, 2 and 3 are essentially the same but the manner of controlling operation thereof differs.

Referring to FIG. 1, the multiple disc clutch which is generally designated 2 is shown connected into a driveline with a torque converter turbine shaft 6 having an axis of rotation. The turbine shaft 6 has an integral or separate sleeve extension 8. A hub constituting a part of the primary side of the clutch is made from two parts 10A and 10B which are secured to each other by screws 10C. The hub part 10A has an integral sleeve 10AA which is connected via a spline 10D to the sleeve 8. The primary side of the clutch also includes an outer sleeve 12 which is internally splined and axially fixed to part 10B of the hub and an annular ring 14 which is also axially fixed to the sleeve 12. Annular ring 16 is mounted via the internal spline on the sleeve 12 in such a manner that it is axially free but rotationally fixed to the sleeve 12. The sleeve 12 also carries five friction clutch discs 18 (of which only one is so designated) which are mounted in splines formed on the internal surface of the sleeve.

The secondary side of the multiple disc clutch includes:

(i) a splined sleeve 24 which carries four axially movable friction clutch discs 26, of which only one is so designated;

(ii) an output on secondary shaft 20, and (iii) a shock absorber 22 disposed between the sleeve 24 and the secondary shaft 20.

Figure 4A:
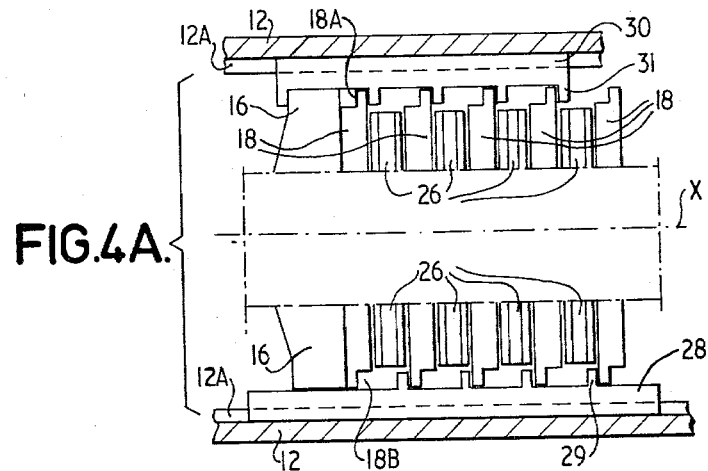
FIGS. 4A, 4B and 4C show diagrammatically the clutch and its spacing elements respectively in an open position in a closed position with new clutch plates and in a closed position with worn clutch plates.
Figure 4B:
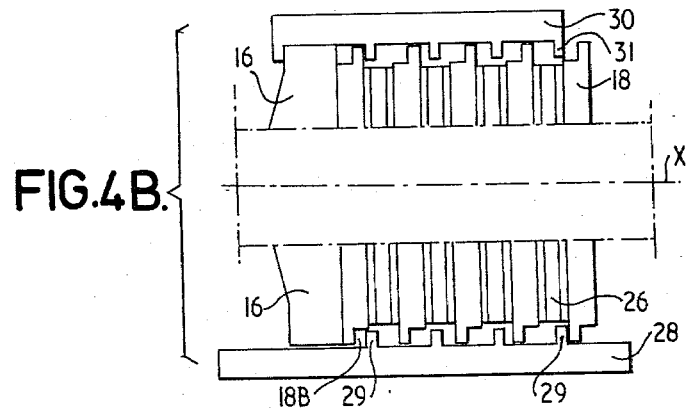
Figure 4C:
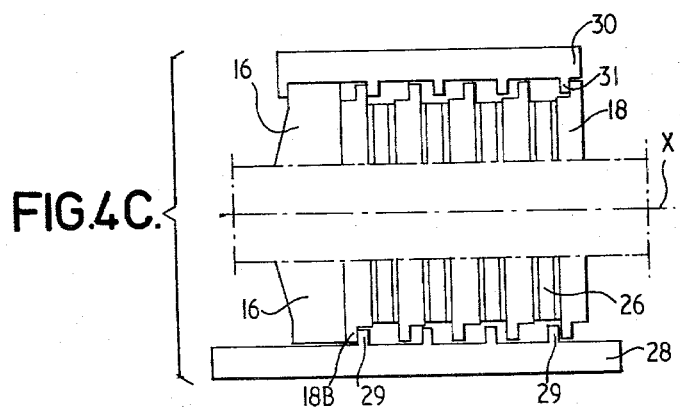
Figure 5:
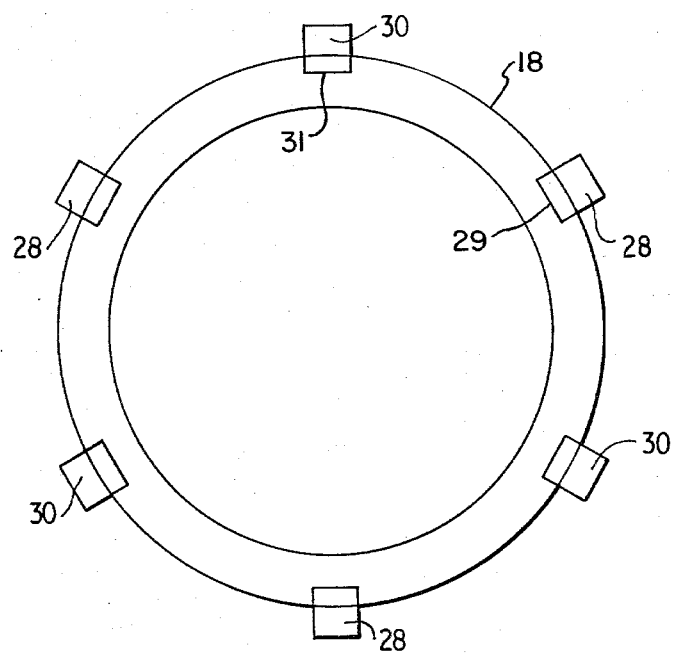
FIG. 5 shows diagrammatically and in end view, an arrangement of alternately disposed spacing members.

The position of the clutch discs 16 and 18 is determined by an assembly of spacing members divided into first and second sets 28 and 30 respectively. Each set consists of three stop members but a greater or lesser number of stop members may be used as required. The assembly of spacing members and clutch discs are shown to an enlarged scale and diagrammatically in FIG. 4 whereas FIG. 5 shows the circumferential spacing alternate positioning of the sets of spacing members 28 and 30. Each stop member is of strip form having a number of inwardly extending and equally spaced fingers which constitute the stops per se. The fingers of stop members 28 are designated 29 and the fingers of the stop members 30 are designated 31. The stop members 28 are axially fixed within the internal splines on the sleeve 12. The fingers 29 of the stop members 28 limit the extreme left hand position of the friction clutch discs 18 in the disengaged position except in the case of the left most disc 18 the position of which is determined by the annular ring 16. For clarity, these internal splines are not designated in FIGS. 1, 2 and 3 but are designated 12A in FIG. 4A. In contrast to the axially fixed positions of the stop members 28, the stop members 30 are axially slidable within the internal splines 12A of the sleeve 12. The fingers 31 of the stop members 30 limit the extreme right hand positions of the clutch discs 18 when the clutch is "open". The extreme right hand position of the clutch discs 18 is, of course determined by the position of the fixed ring 14. The set of spacing members which include stop members 28 with the fingers 29 thereon comprise a first restraining means, while the set of spacing members comprising stop members 30 with fingers 31 thereon comprise a second restraining means.

The arrangement of stop members and their associated equally spaced fingers as described above ensures that the spaces between adjacent clutch discs 18 will be the same. As seen from FIG. 4A, the axial extent or width of the clutch discs 26 is somewhat greater than the axial extent or width of the clutch discs 18 and the reason for this difference is to include means to accommodate wear of the clutch plates as now described. As shown in FIG. 4A regions 18A and 18B of the clutch plates 18 are removed by notching or rebating the clutch plates to provide recess means to receive the fingers 31 and 29 respectively. When the clutch plates become progressively worn during service, and during closing of the clutch, the fingers 29 progressively enter the notches 18B. In this connection FIG. 4B shows the situation where the extreme left hand finger 29 has just entered within the region 18B whereas FIG. 4C shows the condition in which maximum permitted wear of the plates has occurred and the finger 29 has completely entered the region 18B.

The construction and assembly of the stop members 28 and 30 ensures that when the clutch is open each clutch plate 26 has a certain and equal freedom of movement between the adjacent clutch plates 18 between which it is interleaved. Such an ensured freedom of movement is not, however, always sufficient to guarantee the necessary low drag torque required for such a multiple disc clutch. A further and preferable condition is that the clutch plates 26 should be kept substantially centrally within the spaces between adjacent clutch plates 18 without making unnecessary contact with the plates 18 and also without resorting to the use of large quantities of oil to maintain plate separation. To this end, each clutch disc 18, which is made from a suitable steel and normally hardened, has a number, for example, eight waves around its circumference. Thus, contact with an adjacent clutch disc 26 is restricted to the crests of the waves. The height of the waves is of the order of 0.2 mm. Further, the sleeve 24 has a number of radially extending (that is, radial with respect to the axis) inlet holes 32 through which air is conveyed to each side of each plate 20 and air escape holes 34 are formed in the sleeve 12. A separate source of pressure air is not usually necessary because at a sufficient speed difference, for example when the output shaft 20 is stationary and when the turbine shaft 6 is rotating, an air bearing effect is obtained, thereby forcing air through the inlet holes 32 to keep the clutch plates 18 and 26 apart so as to considerably reduce the drag torque.

Our tests have shown that under most driving conditions and particularly during gear shift, the drag torque for the clutch according to the invention is less than the drag torque experienced for a single plate clutch having the same torque capacity. Moreover, the clutch according to the present invention requiries considerably less oil lubrication than other commercially available clutches. In fact, we have found that it is only necessary to lubricate a clutch according to the invention with relatively small quantities of oil or by a mist of small particles of oil contained within an air stream. The use of an air stream has the advantages that it removes any excess oil which would otherwise collect between the plates so as to leave the plates just sufficiently lubricated to produce the low drag torque.

It is common practice for the clutch discs 26 to have linings made from sintered bronze. Such linings do, however, have inherent drawbacks due to the friction coefficient developed during closure or connection of a clutch employing such disc. It is, therefore, difficult to obtain a gentle connection with such clutch discs. However, with a clutch according to the invention it is possible to use a so-called paper lining which is not only considerably cheaper than a sintered bronze lining but, more importantly, from a technical point of view, presents a favourable low friction coefficient development during closure of a clutch using such linings. Hitherto, it has been necessary to use large quantities of lubricating oil in clutches which employed such paper linings. On the other hand, in a clutch according to the present invention the air bearing effect with the wave form of the clutch plates 18 reduces the drag torque to such an extent that paper linings can be used without using the hitherto necessary large quantity of lubricating oil.

In fact, above a certain relatively low speed difference no oil lubrication is necessary. Lubrication is only necessary below a certain speed limit, because above this limit the airbearing effect is sufficient to prevent metallic contact. This means that the quantity of lubrication oil can be limited to that which is normally necessary for a corresponding clutch at this low speed difference. This is especially important to reduce drag torque, but it also has another significant effect in that it permits the use of paper linings even though the amount of lubrication oil use is very limited.

In the assembly of the multiple disc clutch 2 and torque converter shown in FIG. 1, the clutch is operated under the agency of a system of annular Bellville springs 40 which are mounted between an extension 16A on the annular ring 16 and an extension 10E on the hub part 10A. The sleeve 10AA of the hub part 10A is, as mentioned previously, mounted on the sleeve 8 by a spline connection 10D. An inner ring 41 is axially movable and non-rotatably mounted on the external surface of the sleeve 10AA and this ring 41 also carries a bearing 42. The bearing 42 supports an outer ring 43 which is slidably carried on a number of guide-pins 44 which are in turn carried by an attachment 45. A fork 46 is angularly movable about an axis Y and clockwise movement thereof displaces the inner ring 41, the bearing 42 and the outer ring 43 axially and non-rotationally to the right on the sleeve 10AA of the hub part 10A. This movement to the right is transmitted to the ring (thereby determining the opened axial position of the clutch the stop members 30 and hence the clutch discs 18 the clutch) by a lever arm system 48 which fulcrums on a bearing 47. The aforesaid movement to the right and hence movement of ring 16 to the left is against the clutch closing bias of the Bellville springs 40 and, consequently, when the force turning the fork 46 is released, the bias of the Bellville springs forces the ring 16 to the right to close the clutch.

In the assembly of the multiple disc clutch and torque converter shown in FIG. 2, the same reference numbers are used to designate the same components as in FIG. 1. In the assembly of FIG. 2 operation of the clutch is determined by a rotatable annular servo piston 50 sealed by and axially movable in a cylinder 51. Pressure fluid for operating the servo piston 50 is introduced through a conduit 52 and displacement of the piston to the right is transmitted to the ring 16 by a lever system 48 which engages ring 16 at a bearing 47 and which fulcrums at its end with the sleeve 12 at 49. When the pressure of the fluid is released, an annular spring 53 disposed between the annular ring 16 and the hub 10 serves to displace the ring 16 and consequently the axial top member 30 to the left so as to release the axial pressure on the clutch discs.

The secondary or output side of the clutch is simplified compared with the corresponding structure of FIG. 1 and consists of a disc 54 rotationally carried by a spline connection 55 on the output shaft 20. An axial or other bearing 56 is positioned as shown between the disc 54 and the hub 10.

The structure of FIG. 3 differs from that of FIG. 2 in that the piston/cylinder servo arrangement consists of three main parts, namely, a non-rotatable cylinder 51, a non-rotatable piston 52 and a rotatable ring 57 which is not only axially movable together with the piston 52 but is also rotatable within the piston 52. The piston 52 is of "U" cross-section and is sealed in the cylinder with seals 58. The axial position of the rotatable ring 57 in the U-shaped piston is determined by a retaining attachment 59 and a space member 60. The lever arm system 48 is supported on a shoulder of the ring 57 by pins 61.

Operation of the clutch assembly of FIG. 3 is the same as for the assembly of FIG. 2.

I claim:

1. A multiple disc clutch including first and second sets of interleaved and axially movable clutch discs,
   each of the sets being connected to a part through a spline which permits each set to rotate with its respective part and to move axially, wherein, when the clutch is engaged, the two said parts rotate together,
   a servo-means for axially engaging the discs of the first set into engagement with the discs of the second set to close the clutch,
   means fixedly connected to the servo-means for movement therewith for positively, axially displacing each of the discs of the first set towards an open, disengaged position, out of engagement with the discs of the second set,
   first restraining means for positively limiting movement of all of the axially movable discs of the first set in the clutch opening axial direction,
   and said means fixedly connected to the servo-means also being a second restraining means for limiting movement of all of the axially movable discs of the first set, when the clutch is in a disengaged, open condition, in the clutch closing axial direction.

2. A clutch according to claim 1, wherein the surfaces of the discs of the first set are formed with waves, taken in the circumferential direction, and the surfaces of the discs of the second set are plane, and means for permitting air flow through the spaces between the discs in the disengaged open condition, to prevent surface to surface contact between the discs of the first and second sets above a certain relative speed of rotary movement between the first and second sets of discs.

3. A clutch according to claim 1, including means for circulating air between the first and second sets of discs.

4. A clutch according to claim 1, wherein the first and second restraining means comprise stop members which are located circumferentially at positions corresponding to the circumferential waves of the waved discs of the first set.

5. A clutch according to claim 1 or claim 2, each of said first and second restraining means comprising first and second sets of stop members, respectively, the stop members of the two sets being disposed alternately at intervals around the circumference of the first set of discs.

6. A clutch according to claim 5, each said restraining means further comprising fingers on the stop members which extend into the spaces between the first set of discs, and wherein each disc of the first set of discs has recess means shaped to receive said fingers of the stop members of the first restraining means as the clutch discs wear down.

7. A clutch according to claim 6, wherein said fingers comprise a wear limiting means which limits axial movement of the discs of the first set in the closing direction when the discs have worn down.

8. A clutch according to either of claim 1 or 2, wherein each restraining means comprises a set of at least one stop member which comprises an elongated body having a plurality of spacing fingers, the fingers of the stop member or members of the first restraining means serving to limit movement of the first set of discs, when the clutch is in the disengaged position, in the disengaged opening axial direction, and the fingers of the stop member or members of the second restraining means serving to limit movement of the first set of discs, while the clutch is in the disengaged position, toward the closing axial direction.

9. A clutch according to claim 8, wherein the stop member or members of the first restraining means are axially fixed against axial movement.

10. A clutch according to claim 1 or claim 2, wherein the clutch is operated towards at least one of its engaged or disengaged positions by a force means which act through a lever and across a bearing and which opposes a resilient biasing means.

11. A clutch according to claim 10, wherein the biasing means comprises a plurality of Bellville springs.

12. A clutch according to claim 10, wherein the force means is a servomotor device.

13. A clutch according to claim 12, wherein the servomotor is non-rotatable and comprises a fixed annular cylinder and an annular piston sealingly and axially movable within the cylinder.

14. A clutch according to claim 12, wherein the servomotor comprises a non-rotatable part and a rotatable part.

* * * * *